April 21, 1964  M. M. LEVY ETAL  3,129,824
ARTICLE HOLDER AND CONVEYOR SYSTEM
Filed Sept. 19, 1960
11 Sheets-Sheet 1
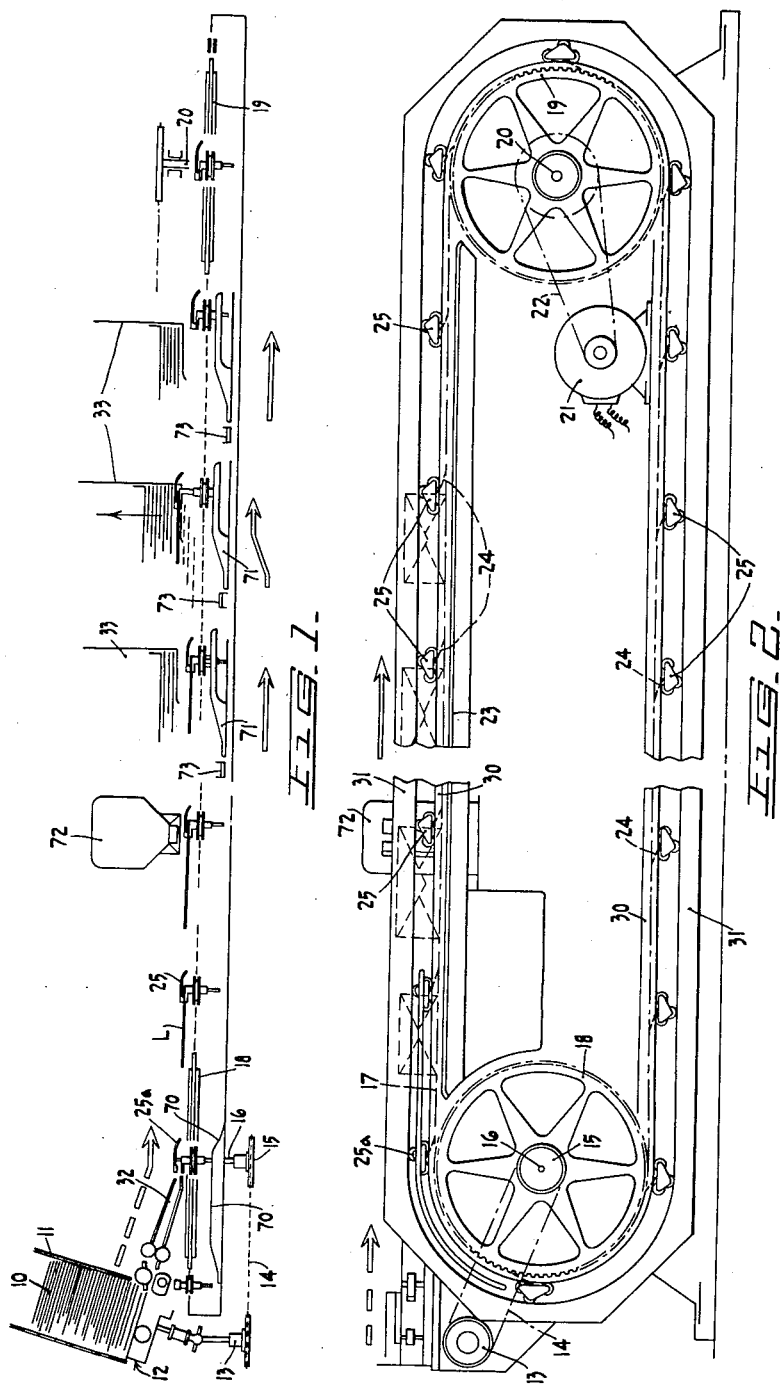

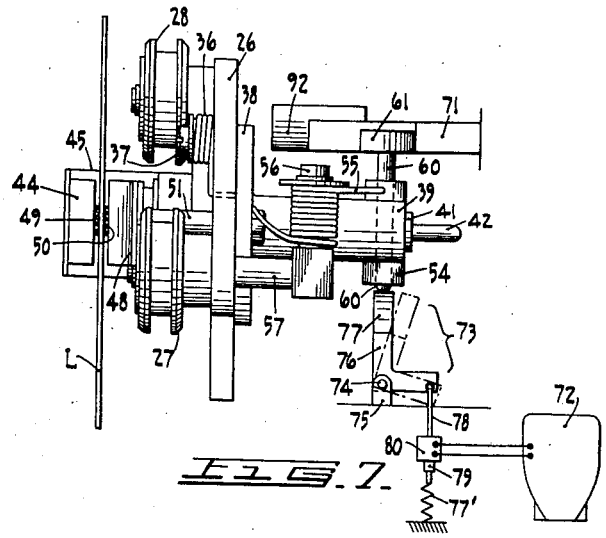
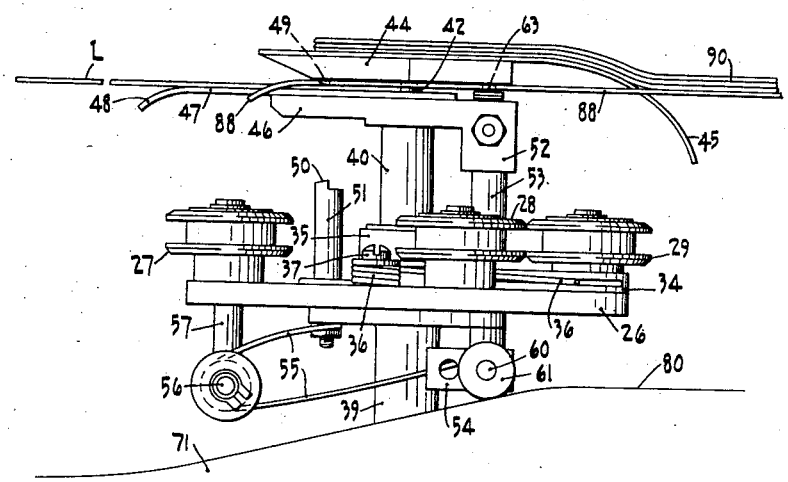

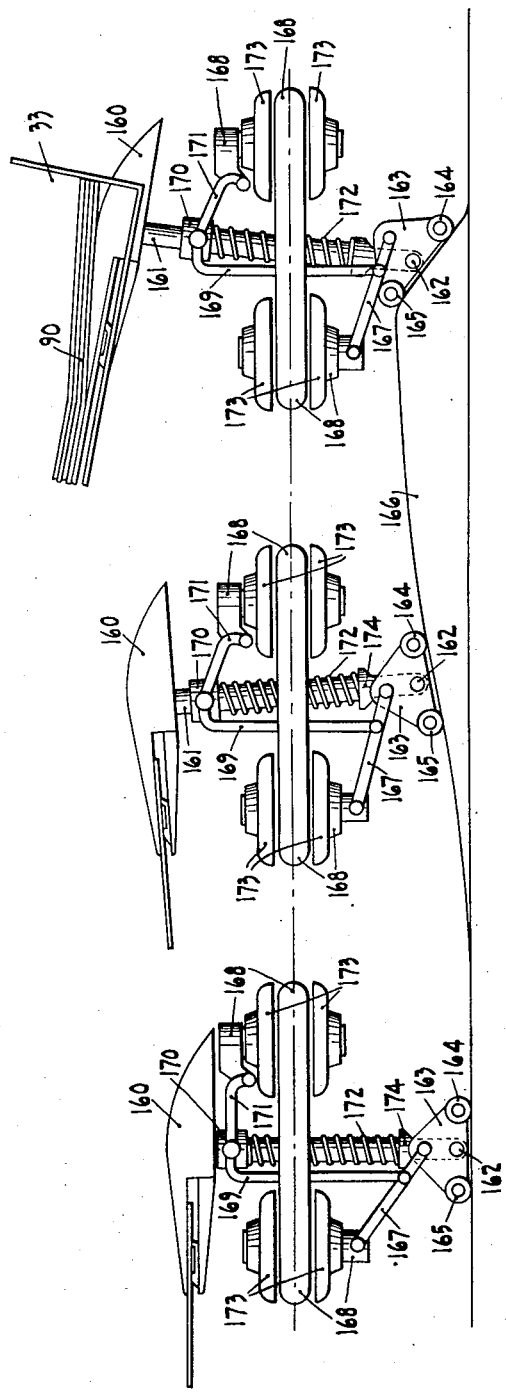

United States Patent Office 3,129,824
Patented Apr. 21, 1964

3,129,824
ARTICLE HOLDER AND CONVEYOR SYSTEM
Maurice M. Levy, Ottawa, Ontario, Canada, and Bela Adolf Arnoti, Concord, N.H., assignors to Her Majesty The Queen in the right of Canada as represented by the Postmaster General, Ottawa, Ontario, Canada
Filed Sept. 19, 1960, Ser. No. 56,925
15 Claims. (Cl. 214—6)

The invention relates to improvements in article holders for use in conveyor systems, and especially to article holders for the handling and conveyance of flat articles such as letters and like articles of letter mail such as post cards. The invention also relates to a conveyor system employing such article holders.

More specifically, the present invention is concerned with apparatus for conveying flat articles individually from one station to another, and for inserting such articles into a stack receiver at the receiving station.

Mail sorting systems have already been developed in which the addresses on pieces of letter mail are first converted into binary code markings impressed on the letters. The letters are then passed individually past an electronic reader which reads each set of code markings and determines from information stored in a file computer to which sortation outlet the letter in question should be conveyed. A stack receiver is provided at each outlet to receive the letters diverted thereto and to form these letters into a stack for subsequent handling.

In the specific form of apparatus illustrated and described below a plurality of such outlets or receiving stations is provided, to any one of which the system may convey each article of letter mail selectively. The conveyor system illustrated thus forms part of a sorting device by which articles of letter mail are conveyed individually to various different receiving stations to be inserted at each such station into a stack receiver for subsequent removal and transmittal to the destination to which such stack receiver corresponds, or for further sorting.

The invention will be further understood with reference to the examples illustrated in the accompanying drawings. In these drawings:

FIGURE 1 is a general schematic plan view of a conveyor system operating in accordance with the present invention;

FIGURE 2 is a side view of the system seen in FIGURE 1;

FIGURE 7 is an end view of the letter-holder of FIGURES 3 to 6 as seen from the left hand side of FIGURE 5 or 6;

FIGURE 8 is a further view of the letter-holder of FIGURES 3 to 6, showing the parts approaching the letter-delivering position;

FIGURE 20 is a plan view of yet another modified construction of letter-holder according to the invention;

FIGURE 21 is a view of the construction of FIGURE 20 with the parts in a second position approaching a stack receiver; and FIGURE 22 is a view of the modification of FIGURES 20 and 21 with the parts in position delivering a letter into a stack receiver.

Figure 3:
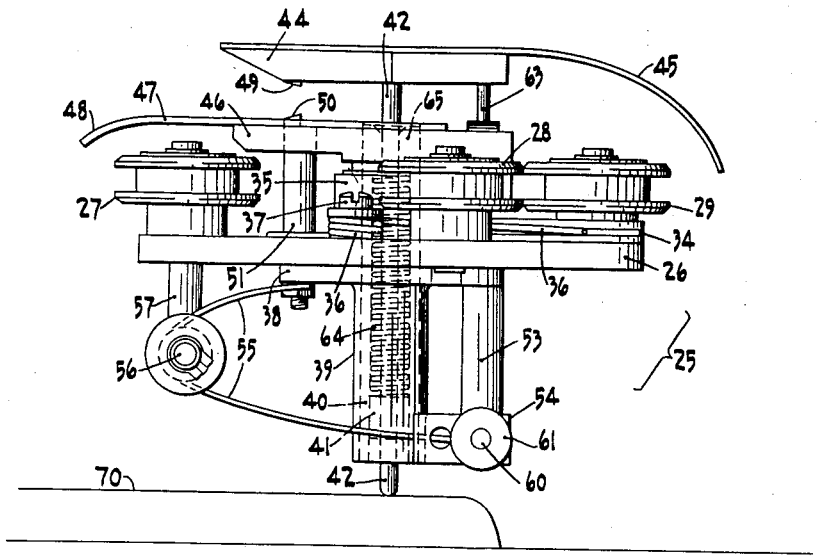
FIGURE 3 is a plan view on an enlarged scale of a first form of letter-holder employed in this system, this letter-holder being shown in a first, letter-receiving condition.

Reference will first be made to the general system and the first embodiment of the invention illustrated in FIGURES 1 to 13. FIGURES 1 and 2 show diagrammatically a conveyor system used for mail sorting. Unsorted letters 10 are inserted in a stacker 11 and are fed individually, and at a predetermined periodicity, by a letter feeder shown generally at 12. Such feeder 12 forms no part of the present invention and will not be further described in detail herein. Suffice to say that this feeder will be of a type adapted to feed individual letters with a predetermined periodicity between passage of successive leading edges of the letters past a given point. An example of a feeder of this type is described in United States Patent No. 2,995,362 issued August 8, 1961. Feeder 12 is supplied with power through sprocket wheel 13 and chain 14 from sprocket wheel 15 on shaft 16. In this way, the feeder 12 is synchronized with travel of the conveyor system, of which shaft 16 forms a driven part.

The conveyor system consists essentially of an endless conveyor chain 17 which passes around two large sprocket wheels 18 and 19 mounted respectively on driven shaft 16 and a driving shaft 20 powered from motor 21 by chain 22. The endless conveyor chain 17 extends as two horizontal spans between wheels 18 and 19. During its passage along the upper horizontal span the chain slides along a support surface 23. At equally spaced intervals along the chain 17, letter-holders 25 are connected to it by short subsidiary chains 24.

These letter-holders 25 each include a frame 26 (see FIGURES 3 and 4) which constitutes a carriage supporting three, free-running, doubly-flanged rollers 27, 28 and 29 which serve to mount the carriage for travel between a pair of horizontal rails 30 and 31 which form a track extending along the conveyor. In this way the letter-holders 25 are caused to travel continuously around the system. As each one passes around the wheel 18 it is brought into position adjacent the delivery channel 32 of the feeder 12. The letter-holder designated 25a is shown in this letter-receiving position in FIGURE 1. The manner in which the jaws of the letter-holder are open to receive a letter in this position will be later described. Each letter-holder 25 is then drawn along the upper span of the conveyor system, and during this travel passes adjacent the receiving end of each one of a plurality of stack receivers 33 that are arranged in a series alongside the conveyor. FIGURE 1 shows three such stack receivers 33. In reality, there will be a considerably larger number, the exact number depending upon the fineness of breakdown of the sortation in progress. A typical number of stack receivers used in a practical installation is 32. These are arranged as a series along the side of the conveyor mechanism, as demonstrated diagrammatically by FIGURE 1, so that each of the letter-holders can be operated by cam mechanisms in the manner later to be described to deposit the letter it is carrying in the selected one of such stack receivers 33. After each letter-holder has accomplished this object, it will be returned empty along the remainder of the upper span of the conveyor, around the wheel 19 and back along the lower span of the conveyor to present itself again at the receiving station adjacent the channel 32.

Figure 4:
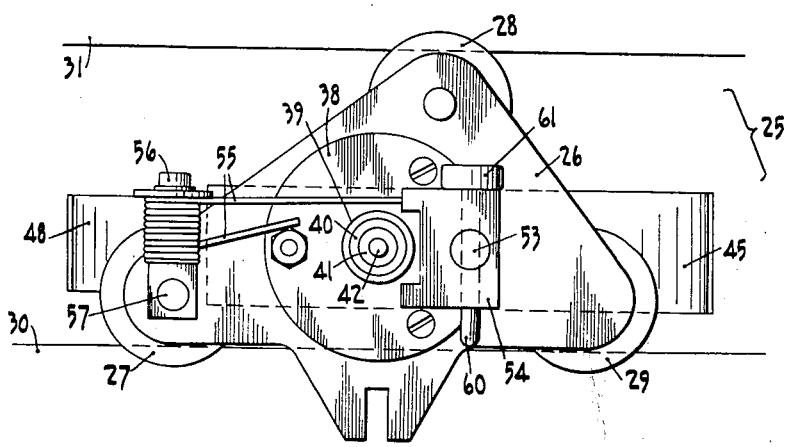
FIGURE 4 is a side view of the letter-holder of FIGURE 3, as seen from beneath FIGURE 3.
Figure 5:
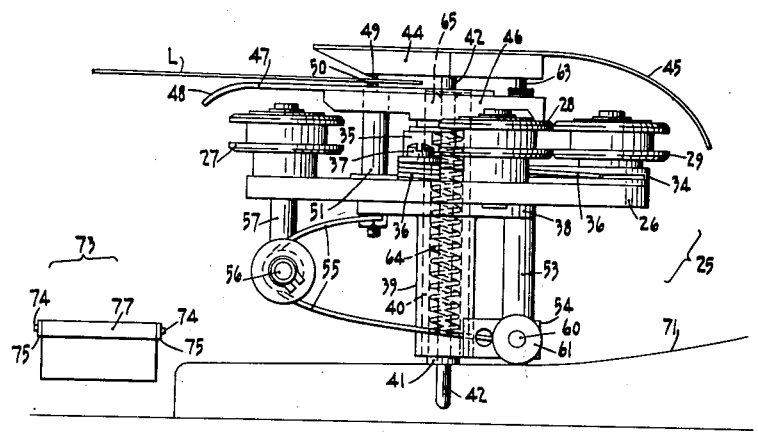
FIGURE 5 is a further view of the letter-holder of FIGURES 3 and 4, with the parts shown in a second, letter-conveying condition.
Figure 6:
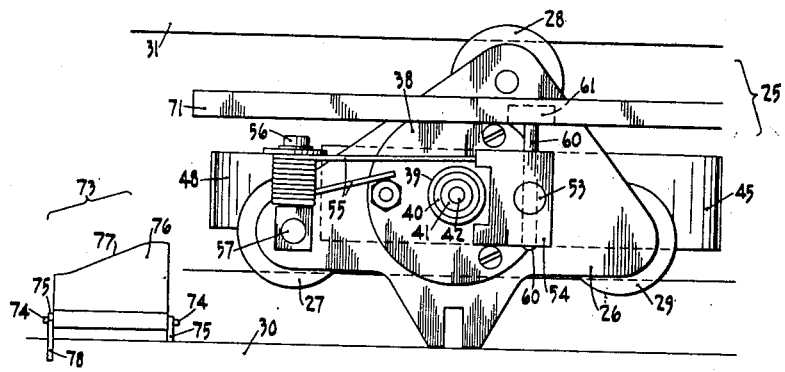
FIGURE 6 is a side view corresponding to FIGURE 4, but showing the parts in their FIGURE 5 positions.
Figure 9:
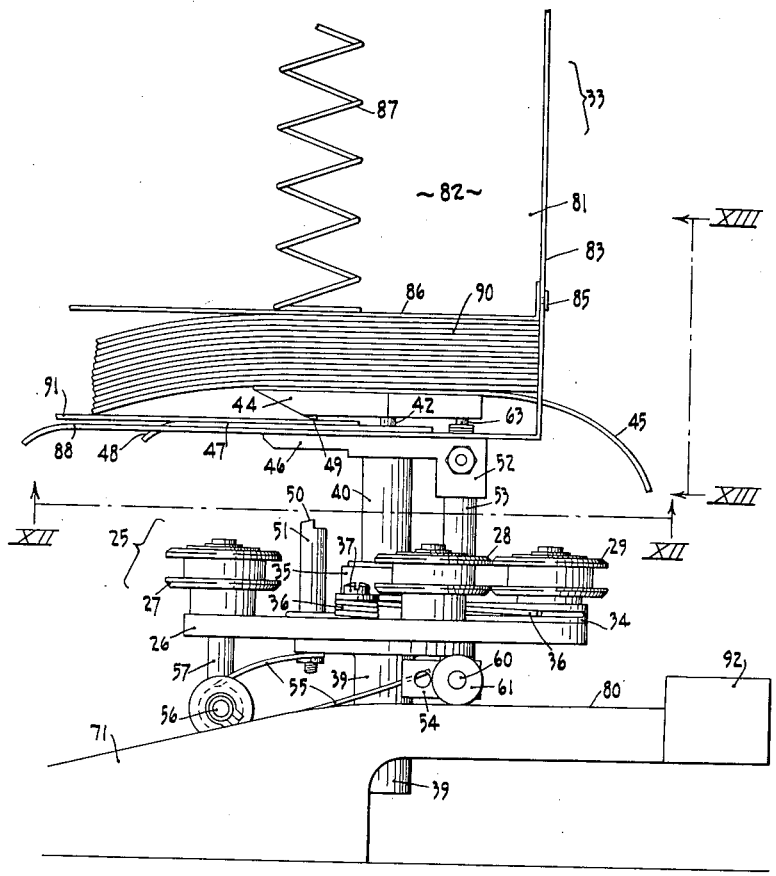
FIGURE 9 is a still further view of the same letter-holder showing the parts a moment later than FIGURE 8 and demonstrating the entry of a letter into a stack receiver.

Attention is now directed to FIGURES 3 to 7 for a short discussion of the structure of each of the letter-holders 25. FIGURES 3 and 4 show a letter-holder 25 with its parts in letter-receiving positions, while FIGURES 5 to 7 show the same holder in the letter-conveying condition.

Rollers 27 and 28 are mounted directly on the carriage frame 26, while the roller 29 is mounted on a separate plate 34 pivotally mounted on the main frame 26 by means of a hub 35, plate 34 being acted upon by a spring 36 secured to frame 26 by stud 37. Spring 36 thus urges the roller 29 resiliently into engagement with rail 30. This manner of mounting one of the rollers permits the letter-holder to accommodate itself to minor changes in spacing between rails 30 and 31, particularly at the ends of the conveyor where the letter-holders are required to travel around wheels 18 and 19.

Secured to the frame 26 by a plate 38 is a tubular housing 39 in which is slidingly mounted a sleeve 40 within which, in turn, there is further slidingly mounted an enlarged end portion 41 of a rod 42. One end of the rod 42 is secured to an outer jaw member 44 which carries on its outer surface a curved, resilient face plate 45. A cooperating inner jaw member 46 is secured to the sleeve 40 and carries a face plate 47 which terminates in a curved end portion 48. Teeth 49 are formed on the inner surface of the jaw member 44, and cooperating teeth 50 are provided on a post 51 secured to the frame 26. When the sleeve 40 is in its withdrawn position (FIGURES 3 and 5), the teeth 50 project through an aperture 66 (seen only in FIGURE 12) in the inner jaw member 46 and its face plate 47 to engage with the teeth 49 to lock a letter L therebetween (see FIGURE 5). However, as appears from FIGURE 8, as soon as the sleeve 40 is moved outwardly of its a housing 39 to move the whole jaw assembly to a position projecting from the carriage, the jaw member 46 is moved away from the post 51 so that the teeth 50 can no longer project through such member into engagement with the teeth 49.

An enlarged portion 52 of the jaw member 46 (best seen in FIGURE 8) serves to connect such jaw member to a sleeve 53 which is slidably mounted to pass freely through a hole in the frame 26 and also through a slot in the roller-supporting plate 34 (to permit uninterrupted transverse movement of the latter). At its other end, the sleeve 53 carries a block 54 which is acted upon by one end of a spring 55 which is wound around a post 56 secured to the frame 26 by a further post 57, the other end of the spring 55 bearing against the plate 38. This spring 55 thus serves to urge the block 54 into the position which it is seen to occupy in FIGURES 3 and 5. Extending through the block 54 transversely of the sleeve 53 is a pin 60, one end of which carries a roller 61.

FIGURES 4, 6 and 7 provide a comparison of the two possible positions of the pin 60, firstly with the roller 61 lying against the side of the block 54, as shown in FIGURE 4, or alternatively, with the roller 61 projecting therefrom, as seen in FIGURES 6 and 7. The sleeve 53 is hollow and within its upper part there slides a rod 63, the outer end of which is connected to the outer jaw member 44, thus preventing any rotation of this member about its mounting by rod 42 within the sleeve 40. In addition to the spring 55 which urges the block 54 and hence the inner jaw member 46 (through the agency of the sleeve 53) into a withdrawn position (FIGURES 3 and 5), there is a further spring 64 mounted within the sleeve 40 and acting between a fixed abutment 65 in sleeve 40 and the enlarged portion 41 of the rod 42. This spring 64 urges the outer jaw member 44 also into its withdrawn position. Thus, in the normal rest or "letter-conveying" condition of the letter-holder seen in FIGURE 5, the jaw members 46 and 48 are urged together, while the jaw assembly which they constitute is held in a generally withdrawn position. Moreover the locking means (teeth 49, 50) are in operative position to hold the letter firmly.

FIGURE 3 demonstrates the manner in which forcing of the end of the rod 42 remote from its associated jaw member 44 against the action of the spring 64 by a cam surface 70 will open the jaw members to place these in letter-receiving position. Alternatively, and as demonstrated in FIGURE 8, action by a cam surface 71 on the roller 61 will act against the pressure of the spring 55 to move outwardly the inner jaw member 46 and hence the whole jaw assembly. This position shown in FIGURE 8 in which the jaw assembly projects is known as the letter-delivering position, and it will be noted that in this position the letter-gripping teeth 49 and 50 (locking means) are automatically separated by the bodily outward movement of the jaw assembly, so that the letter is now held more gently, while still being retained by the jaw members. Whether or not this outward movement takes place, is determined by the position of the pin 60. If the pin 60 is in the position seen in FIGURE 4, then the roller 61 is out of alignment with and will not engage the cam 71. On the other hand, if the pin 60 is displaced to the position shown in FIGURES 6 and 7, the roller 61 will be in alignment with the cam 71 and movement of the parts to the position shown in FIGURE 8, and subsequently to the positions shown in FIGURES 9 and 10 will take place.

FIGURES 3 and 4 show the condition of each letter-holder at the letter-receiving station, the jaw members 44 and 46 being held apart by engagement of rod 42 by cam 70, letter-holder 25a being shown in this condition in FIGURE 1. The apparatus will be so synchronized that the feeder 12 will rapidly pass a letter into the open jaws of this letter-holder 25a just a moment before this letter-holder passes beyond the end of the cam 70. The letter-holder will thus receive and substantially simultaneously clamp between its jaws the letter so delivered to it. It will then convey such letter along the conveyor with the jaw members firmly gripping the letter.

The first instrumentality that the letter passes is an electronic reader 72 which scans the coded address already impressed on the letter. This reader 72 will include a file computor to select the required stacker to which each letter scanned by the reader 72 is to be conveyed, and at the correct time in the sequence of travel of the letter-holders 25 to actuate one of the movable setting cams 73. These parts (reader and associated computor) form no part of the present inventive advance and consequently will not be further described in detail. For further information concerning the manner of operation of such parts attention is directed to United States Patent No. 2,925,586, issued February 19, 1960, United States patent application No. 421,644, filed April 7, 1954, now abandoned, (Canadian Patent No. 539,092), and "Automation in Post Offices," volume XI, Proceedings of the National Electronics Conference, October 1955.

As best seen from FIGURES 5, 6 and 7, each cam 73 constitutes a setting device and consists of an L-shaped member pivotally mounted by pin 74 on upstanding supports 75. The upwardly projecting portion 76 of each cam 73 is formed with an upwardly inclined cam surface 77. Tilting of the cam 73 affords two possible positions for the surface 77. Cam 73 is normally urged to inoperative position (broken lines in FIGURE 7) by tension spring 77' acting through rod 78, the latter carrying an armature 79 of a solenoid 80 controlled from reader 72.

In the operative position of cam 73 shown in FIGURES 5 and 6 and in full lines in FIGURE 7, the cam surface 77 is arranged in the path of travel of the end of pin 60 opposite roller 61. As a result, passage of the letter-holder past a cam 73 in its operative position, forces upwardly the pin 60 to set the roller 61 in alignment with the cam 71 (FIGURE 7) to give rise subsequently to the series of movements which have already been briefly described with respect to FIGURE 8, and which will be described in more detail below in connection also with FIGURES 9 to 13. FIGURE 7 also shows cam 73 in broken lines in its inoperative position out of alignment with the path of travel of successive pins 60.

The effect of a cam 73 being placed in operative position with the roller 61 consequently being forced into alignment with a cam 71 is illustrated in FIGURES 8 to 13. FIGURE 8 shows a roller 61 riding up the incline surface of a cam 71 with consequent forcing of the sleeves 53 and 40 outwardly of the carriage. Cam 71 thus constitutes an operating device. Although the letter L continues to be retained between jaw members 44 and 46, the effectiveness of teeth 49 in exerting a locking grip on the letter is reduced by the movement of the jaw member 46 away from teeth 50. As the parts continue towards the position shown in FIGURE 9 with roller 61 now travelling along a flat portion 89 of the cam 71 which extends parallel with the path of travel of the carriage, the sleeves 40 and 53 take up their maximum extended positions while the jaw assembly that they carry enters the selected stack receiver 33.

This stack receiver 33 consists of a letter-holding tray 81 (see also FIGURES 12 and 13) having a bottom wall 82, side wall 83, slotted at 84 to receive pins 85 connected to a backing member 86 which is urged by a spring 87 towards the front face of the tray 81. This front face is constituted by a pair of spaced panels 88, the jaw assembly of the letter-holder 25 entering the tray 81 between the panels 88 with the face plate 45 pushing back into the tray 81 those letters, designated 90, that are already in the tray in the form of a compressed stack to make room for the newly arriving letter, designated 91.

Figure 10:
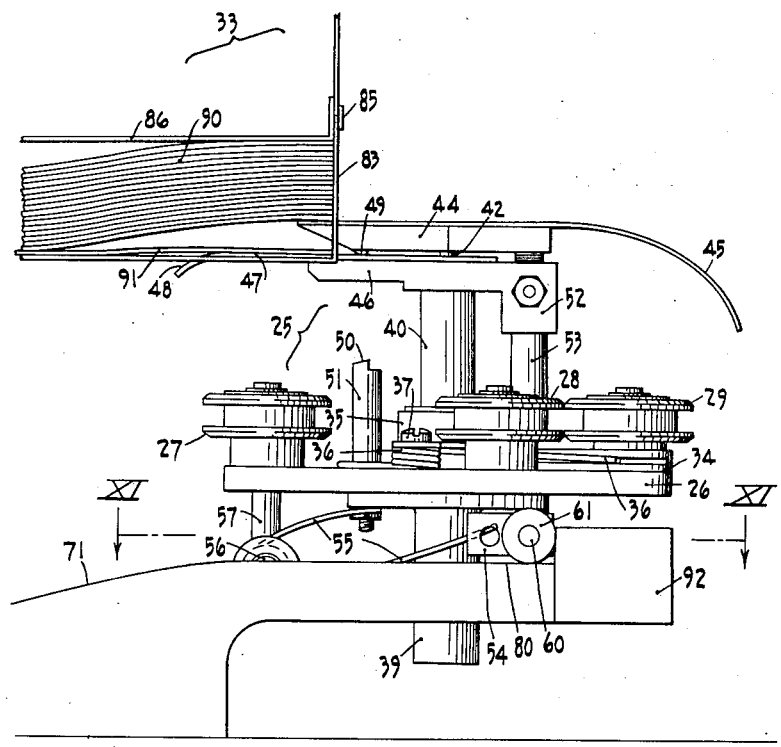
FIGURE 10 is a view of the same parts a moment later than FIGURE 9 in the operation of the apparatus, showing the letter being left behind in the stack receiver.
Figure 11:
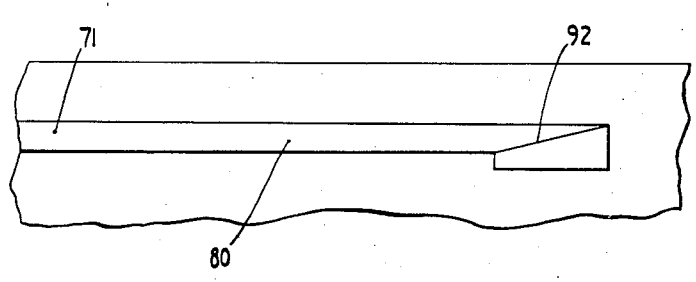
FIGURE 11 is a view of certain cam parts associated with this operation, as seen in the direction XI—XI in FIGURE 10 with the letter-holder omitted from this view.
Figure 12:
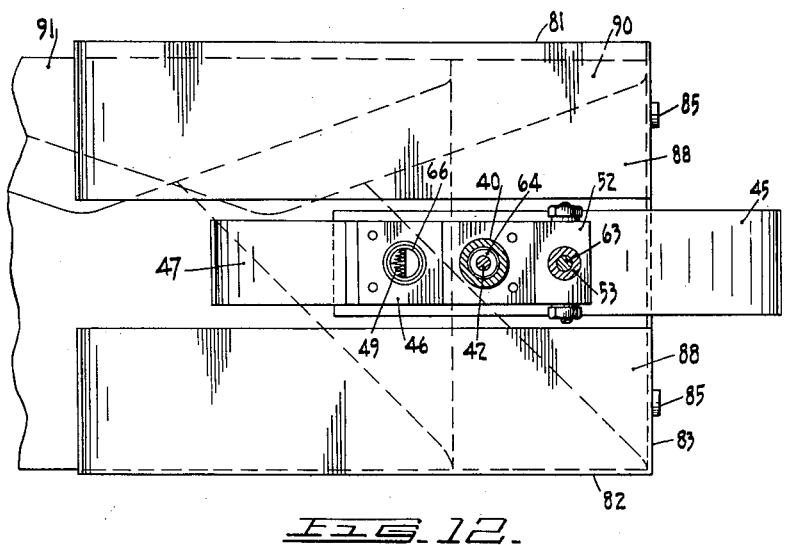
FIGURE 12 is a view on the line XII—XII in FIGURE 9.
Figure 13:
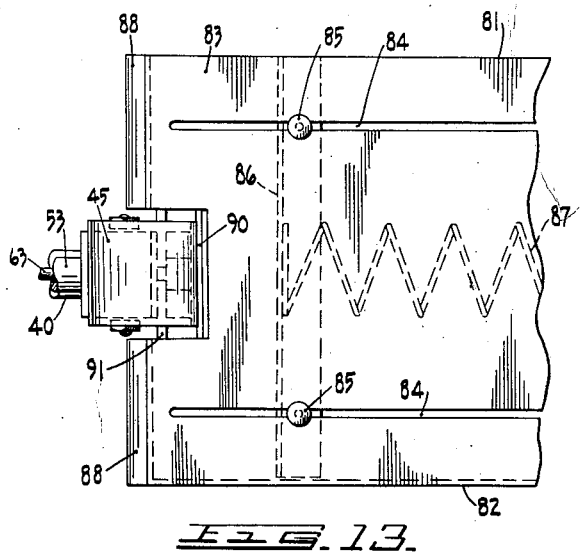
FIGURE 13 is a view on the line XIII—XIII in FIGURE 9.
Figure 14:
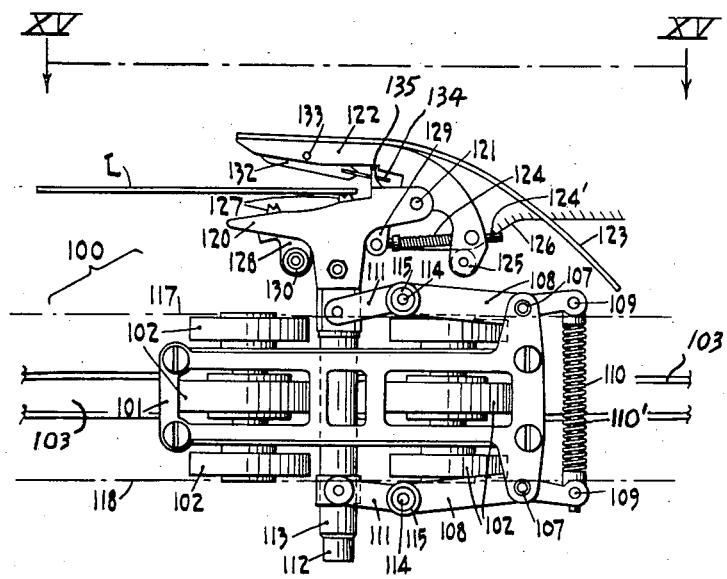
FIGURE 14 is a plan view of a second form of letter-holder according to the invention, showing the parts in the letter-receiving position.
Figure 15:
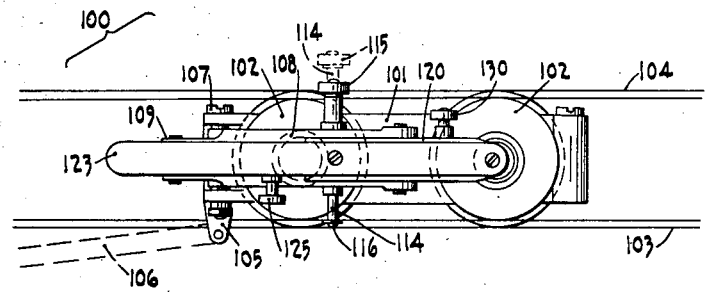
FIGURE 15 is a view on the line XV—XV in FIGURE 14.
Figure 16:
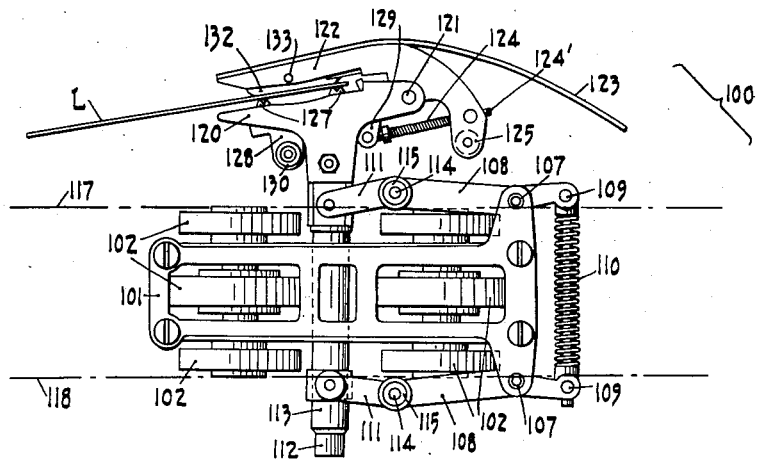
FIGURE 16 is a view of the letter-holder of FIGURES 14 and 15, showing the parts in the letter-conveying position.

As travel of the letter-holder continues through the passageway between spaced panels 88, the new letter 91 finally strikes the side wall 83 of the tray 81 which wall arrests any further forward travel of such letter. In this way the newly arrived letter is withdrawn by the stack receiver 33 from the jaws of the travelling letter-holder in alignment with the previously deposited letters. The operation is illustrated in FIGURE 10. At this point in its travel the roller 61 comes to bear against a further cam surface 92 which constitutes a resetting device and pushes such roller in its axial direction to return the pin 60 from the position shown in FIGURE 6 to that shown in FIGURE 4. This resetting movement of the pin 60 by cam surface 92 forces the roller 61 sidewards off portion 80 of the cam 71 and simultaneously positions the roller 61 so that it will not engage the next successive cam 71. The reader 72 will move only one of the setting cams 73 to operative position for each of the letter-holders 25 during each passage of such holder along the upper horizontal span of the conveyor, and will be timed to do this just before the letter-holder in question reaches the setting cam 73 corresponding to the stack receiver 33 into which the code markings on the letter being conveyed by such letter-holder indicate the letter should be sorted, thus avoiding such operated setting cam acting on the previous letter-holder. Each letter-holder will encounter only one operated setting cam 73 in its travel along the conveyor and will thus play no further part in the system until it has come again to the loading station immediately above the wheel 18 where it will receive another letter from the feeder 12.

An alternative construction of letter-holder is shown in FIGURES 14 to 17. This modified letter-holder 100 comprises a carriage 101 on which are supported six free running rollers 102 that travel between suitable flanged rail structures 103 and 104, shown only diagrammatically in FIGURES 14 and 15, and which engage only the centre wheels 102. Frame 101 carries a bracket 105 (FIGURE 15) to which an auxiliary chain 106 can be attached for connection to the general conveyor system for propulsion of the device.

Frame 101 also supports on pivot pins 107 a pair of arms 108, projecting ends 109 of which are urged apart by a compression spring 110 mounted over a rod 110' that is secured to one end 109 and slides in the other. The other ends 111 of arms 108 are respectively connected to a pair of interconnected members 112 and 113, the larger member 113 constituting a sleeve slidingly engaging the exterior of the smaller member 112. Each of the arms 108 carries a transversely slidable pin 114 on the end of which is mounted a roller 115. This pin and roller combination corresponds to the pin 60 and roller 61 of the previously embodiment, and, in a similar manner, an upward movement of each pin 114 to the broken line position of FIGURE 15 by contact between the lower end 116 of the pin and an operating cam, will push the pin 114 upwardly to present its roller 115 to a further cam structure analagous in operation to the cam 71. This further cam structure is shown diagrammatically in FIGURES 14, 16 and 17 by the broken lines 117 and 118.

Member 112 carries a first jaw member 120, to which there is pivotally connected by pin 121 a second, cooperating jaw member 122 which carries a curved resilient facing member 123. The movable jaw member 122 is spring urged into closing relationship with the fixed jaw member 120 by a compression spring 124 mounted on a rod 124' connected at one end to a portion 129 later to be described and slidable at its other end in jaw member 122. Movable jaw member 122 also carries a roller 125 adapted for cooperation with a cam surface 126 (FIGURE 14) whereby the jaws may be opened against the force of spring 124.

The jaw assembly is provided with two sets of teeth 127 that are mounted on a member 128 pivoted about the pin 121. The portion 129 already mentioned is a part of the tooth-bearing member 128. In this way the spring 124 serves the double purpose of urging the movable jaw member 122 anticlockwise while urging the tooth-bearing member 128 clockwise. The member 128 also carries a roller 130 which is positioned on the opposite side of the apparatus from roller 125 (see FIGURE 15) and is positioned for cooperation with a further cam surface 131 (see FIGURE 17).

Figure 17:
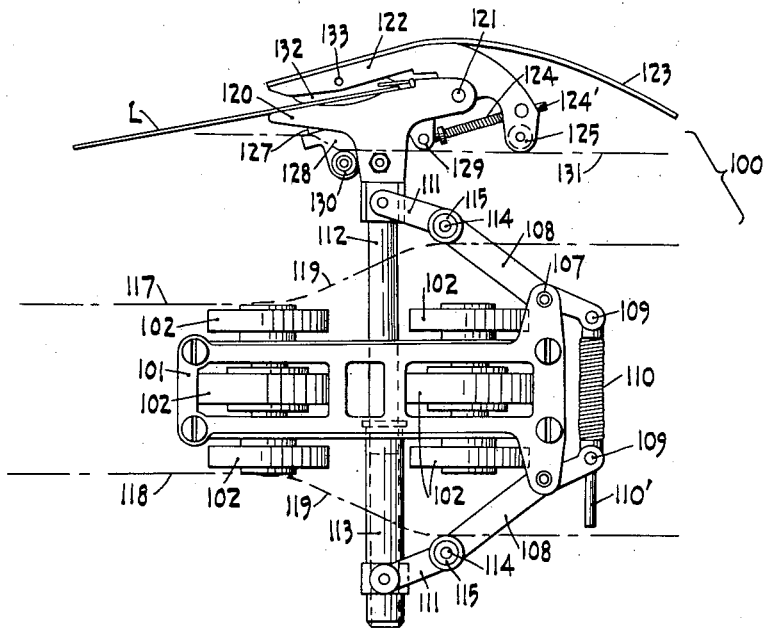
FIGURE 17 is a further view of the letter-holder of FIGURE 15 showing the parts in the letter-delivering position.

The letter-holder 100 thus has the same three basic positions as the holder 25. Firstly there is the letter-receiving position shown in FIGURE 14. In this condition the parts 112 and 113 are telescoped together but the jaw members are held apart by the cam surface 126. As soon as the letter L has been inserted, the jaw members will close so that the holder assumes the letter-conveying position shown in FIGURE 16. When the holder reaches the stack receiver to which the letter L is to be conveyed, a cam (not shown) similar to a cam 73 will urge both pins 114 to their upper position shown in broken lines in FIGURE 15, so that their rollers 115 will come into engagement with inclined portions 119 of cam tracks 117 and 118, which will spread the members 112 and 113 apart to move the whole jaw assembly up into letter-delivering relationship to the stack receiver (not shown in FIGURE 17 but generally similar to a stack receiver 33) similarly to the manner in which the letter-holders 25 present a letter to a stack receiver 33. This action brings the roller 130 into engagement with the cam surface 131 with the result that the tooth-bearing member 128 is forced anti-clockwise as seen in FIGURE 17 to withdraw its teeth 127 from engagement with the letter L and hence relax the hold of the device thereon to facilitate the letter's transfer into the stack receiver.

The movable jaw member 122 carries an elongated member 132 (best seen in FIGURE 14) which is pivoted centrally on its own length to the jaw member 122 by a pin 133. The surface of the member 132 which contacts the letter L is provided with a suitable surface of comparatively high friction material such as rubber. By virtue of its ability to pivot at 133, this member 132 can ensure application of equal pressure between the letter L and the two sets of teeth 127. Member 132 carries a rearward extension 134 which slides between the prongs of a forked pillar 135 secured to fixed jaw member 120, so that, even when the member 132 is pivoted to its extreme anticlockwise position, such member and pillar 135 prevent entry of an edge of the letter L so far into the jaw structure that it might become caught therein.

Figure 18:
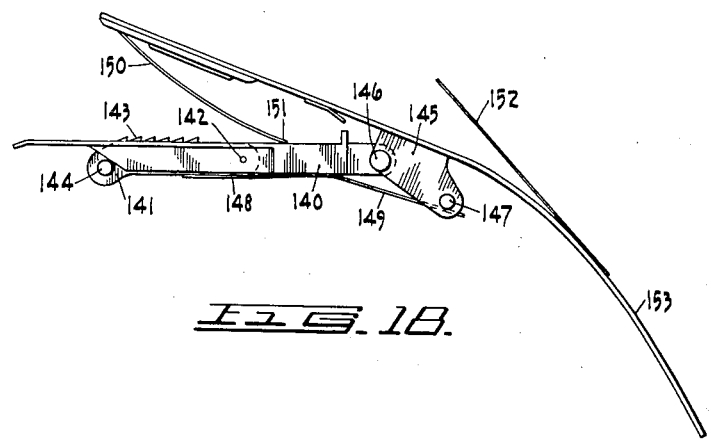
FIGURE 18 is a fragmentary view showing a modified form of jaw mechanism for use in a letter-holder according to the invention, with the parts shown in open, letter-receiving position.
Figure 19:
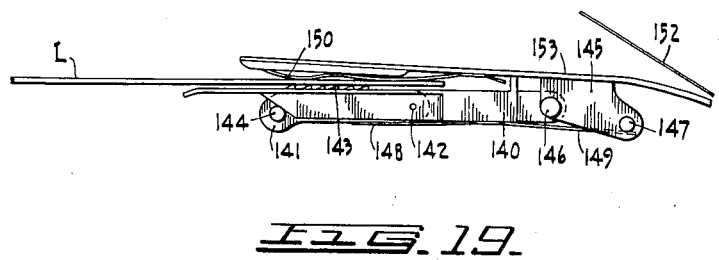
FIGURE 19 is a view of the modification of FIGURE 18 with the parts shown in closed, letter-conveying position.

FIGURES 18 and 19 show an alternative construction of jaw assembly. In this construction the fixed jaw member 140 carries a member 141 pivoted at 142 and provided with teeth 143 which extend through a slot in the member 140, a pin 144 extending outwardly from the member 141 transversely to its extent being provided to cooperate with fixed cam surfaces along the conveyor system for movement of the teeth 143 out from between the jaws when the letter-holder reaches its letter-delivery position at the selected stack receiver. The movable jaw member 145 is pivoted to the fixed jaw member 140 by pin 146 and also carries a transversely extending pin 147 for cam operation as required to open the jaws to letter-receiving condition at the loading station. Both the tooth-bearing member 141 and the movable jaw member 145 are urged to the letter-carrying position shown in FIGURE 19 by leaf springs 148 and 149 respectively.

The jaw member 145 differs from those previously described in that it contains a pair of leaf springs 150 (not separately visible in FIGURES 18 and 19, since they are identical with each other and lie one behind the other) which straddle the teeth 143 in the closed position of the jaw assembly to hold the letter L firmly therein. However, the principal function of the springs 150 occurs when the jaws are opened in the letter-receiving condition of FIGURE 18. The feeder 12 shown in FIGURE 1 delivers a letter at a high speed into the jaws of the letter holder. There may, under certain circumstances (such as an error in the exact timing) be a tendency for the letter to rebound out of the jaws if they do not close rapidly on the letter. The springs 150 serve an anti-rebound function, their tips 151 being in contact with the member 140, even in the fully open position of the jaws. These tips 151 will exert a light holding pressure on the letter as it is received and thus have a tendency to check any attempt by the letter to rebound out of the jaws. Element 152 is a light spring to cushion the blow on letters in a stack receiver of the curved blade 153 connected to the outer jaw member 145.

One difficulty sometimes encountered in practice is the inflicting of damage to letters already in the stack receiver by the letter-holder as it enters the stack receiver to insert a fresh letter. Any such damage usually takes the form of folding over of a long letter. The curved, resilient facing members 45 and 123 largely eliminate this trouble, but the possibility of damage can be still further diminished by turning the stack receiver so that the letters in it lie at an inclination to the direction of travel of the letter-holder at the area of contact. The letter-holder will then strike the outermost letter in a direction which has a component normal to the letter as well as one parallel to it. If this method is employed, while at the same time the area of contact is located so as to fall within even the shortest letter being handled, then the chance of bending over the free end of the outermost letter already in the stack receiver is greatly reduced. However, inclining the stack receiver introduces the complication that the path of travel of the jaw assembly requires modification. Although the jaw assembly is required to be moving in a direction having a component normally to the planes of the letters already in the stack receiver as it strikes the outermost letter in order to force the letters back and make space for the newly arriving letter, it is subsequently required to move generally parallel to the face of the outermost letter as it deposits the new letter and passes beyond the stack receiver. In other words the jaw assembly will be required to change its direction of travel at approximately the moment of its entry into the stack receiver.

This manner of operation can be achieved in the embodiment of the invention illustrated in FIGURES 20 to 22 by mounting the jaw assembly, which is here shown generally as 160, on a pin 161 which is pivoted at its other end at 162 to a triangular carriage 163 which bears rollers 164 and 165 for engagement with a cam surface 166 similar to the cam surface 71 already discussed. A linkage mechanism is provided consisting of a link 167 connected to the plate 163 and to the carriage shown diagrammatically at 168, a second link 169 connecting an intermediate portion of the link 167 with a collar 170 on the pin 161, and a third link 171 which interconnects the collar 170 and another portion of the carriage 168. A compression spring 172 surrounds the pin 161 and extends between the collar 170 and a fixed stop 174 at the other end of the pin 161 adjacent the connection at 162. The carriage 168 has the usual rollers 173 for travel along the conveyor system. The stack receiver 33 containing letters 90 is inclined as shown in FIGURE 22.

A comparison of FIGURES 20, 21 and 22 will illustrate the result of the rollers 164 and 165 being caused to follow the contour of the cam surface 166, which action will be initiated by a setting cam (not shown) in a similar manner to engagement of the rollers 61 and 115. The jaw assembly 160 will not only be displaced transversely of the direction of travel, but will also be tilted first anti-clockwise at the moment when it enters the stack receiver 33 to engage the outermost one of the letters 90 therein, and then promptly clockwise to follow the plane of such outermost letter. Although not explicitly illustrated, the jaw assembly 160 will comprise a pair of individual jaw members capable of being separated into a letter-receiving position in a manner similar to that already explained in connection with the other embodiments.

We claim:
1. An article holder comprising
 (a) a carriage including means defining orientation of said carriage for travel along a conveyor,
 (b) a jaw assembly for holding a flat article for travel with the holder,
 (c) means mounting said jaw assembly on said carriage for movement generally transversely of the direction of travel of said carriage between a withdrawn position and a projecting position,
 (d) said jaw assembly including a pair of individual jaw members relatively movable between an open, article-receiving position and a closed, article-conveying position,
 (e) locking means associated with said jaw assembly for movement between a first condition in which an article held within closed jaw members is firmly engaged and retained therein and second condition in which said article is gently engaged while still retained therein, (f) and means interconnecting said locking means and jaw assembly for moving said locking means to its second condition upon achievement by said jaw assembly of its projecting position.

2. An article holder according to claim 1, wherein said jaw assembly further includes anti-rebound means effective in the open, article-receiving position of the jaw members to inhibit any tendency of an article moved into position between said jaw members to rebound outwardly therefrom.

3. An article holder according to claim 1, wherein said article holder includes a facing member having a surface arranged in a leading position on said holder, said surface being inclined rearwardly and outwardly in relation to the direction of travel of said carriage along the conveyor and the direction of projection of the jaw assembly, whereby to enable said surface to push back the more recently arrived articles in a stack receiver to make room for a newly arriving article introduced by the jaw assembly.

4. A conveyor system for transporting flat articles, comprising
   (a) a fixed conveyor track defining a direction of travel,
   (b) a series of stack receivers disposed along said conveyor track adjacent thereto,
   (c) a plurality of article holders,
   (d) means for moving each of said article holders along said conveyor track for transporting an article and depositing said article in a selected stack receiver,
   (e) each said article holder comprising,
      (i) a jaw assembly for holding a flat article generally in a plane in which said direction of travel lies with said article projecting laterally from said jaw assembly,
      (ii) means mounting said jaw assembly for movement generally transversely of said direction of travel between a withdrawn position and a projecting position,
      (iii) and means continuously urging said jaw assembly to withdrawn position,
   (f) each said stack receiver including
      (i) means mounting previously deposited articles as a compressed stack urged to extend yieldably into the path of travel of a jaw assembly in projecting position,
      (ii) and means for arresting further travel of an article conveyed by a projecting jaw assembly in alignment with the previously deposited articles while defining a passageway for continued travel of the jaw assembly whereby to withdraw the newly arrived article from the jaw assembly and add it to the stack,
   (g) and said conveyor track including
      (i) a series of operating devices disposed along said track, each associated with a respective stack receiver and each positioned for cooperation with a travelling article holder to act on the means mounting the jaw assembly of such article holder to overcome said urging means and move the jaw assembly to its projecting position in alignment with the associated stack receiver for transfer of an article from the article holder to such receiver,
      (ii) the cooperation between each said operating device and an article holder being continuous during the period of transfer of an article from the holder to a stack receiver whereby the position of the jaw assembly of the article holder is uniquely determined by the position of the holder along the conveyor track.

5. A conveyor system for transporting flat articles, comprising
   (a) a conveyor defining a direction of travel,
   (b) a series of stack receivers disposed along said conveyor adjacent thereto,
   (c) and a plurality of article holders connected to said conveyor, each for transporting an article and depositing said article in a selected stack receiver,
   (d) each said article holder comprising,
      (i) a carriage including means defining orientation of said carriage for travel along the conveyor,
      (ii) a jaw assembly for holding a flat article generally in a plane in which said direction of travel lies with said article projecting laterally from said jaw assembly,
      (iii) means mounting said jaw assembly on said carriage for movement generally transversely of the direction of travel of said carriage between a withdrawn position and a projecting position,
      (iv) said jaw assembly including a pair of individual jaw members relatively movable between an open, article-receiving position and a closed, article-conveying position,
      (v) locking means associated with said jaw assembly for movement between an operative position in which an article held within closed jaw members is firmly engaged and retained therein and an inoperative position in which said article is gently engaged while still retained therein,
      (vi) and means interconnecting said locking means and jaw assembly for moving said locking means to its inoperative position upon movement of said jaw assembly to its projecting position,
   (e) and each said stack receiver including
      (i) means mounting previously deposited articles as a compressed stack urged to extend yieldably into the path of travel of a jaw assembly in projecting position,
      (ii) and means for arresting further travel of an article conveyed by a projecting jaw assembly in alignment with the previously deposited articles while defining a passageway for continued travel of the jaw assembly whereby to withdraw the newly arrived article from the jaw assembly and add it to the stack.

6. A conveyor system for transporting flat articles, comprising
   (a) a fixed conveyor track defining a direction of travel,
   (b) a series of stack receivers disposed along said conveyor track adjacent thereto,
   (c) a plurality of article holders,
   (d) means for moving each of said article holders along said conveyor track for transporting an article and depositing said article in a selected stack receiver,
   (e) each said article holder comprising,
      (i) a carriage including means defining orientation of said carriage for travel along said track,
      (ii) a jaw assembly for holding a flat article generally in a plane in which said direction of travel lies with said article projecting laterally from said jaw assembly,
      (iii) means mounting said jaw assembly on said carriage for movement generally transversely of the direction of travel of said carriage between a withdrawn position and a projecting position,
      (iv) said jaw assembly including a pair of individual jaw members relatively movable between an open, article-receiving position and a closed, article-conveying position,
      (v) locking means associated with said jaw assembly for movement between an operative position in which an article held within closed jaw members is firmly engaged and retained therein and an inoperative position in which said article is gently engaged while still retained therein,
  (vi) means interconnecting said locking means and jaw assembly for moving said locking means to its inoperative position upon movement of said jaw assembly to its projecting position,
  (vii) and means continuously urging said jaw assembly to withdrawn position,
(f) each said stack receiver including
  (i) means mounting previously deposited articles as a compressed stack urged to extend yieldably into the path of travel of a jaw assembly in projecting position,
  (ii) and means for arresting further travel of an article conveyed by a projecting jaw assembly in alignment with the previously deposited articles while defining a passageway for continued travel of the jaw assembly whereby to withdraw the newly arrived article from the jaw assembly and add it to the stack,
(g) and said conveyor track including
  (i) a series of operating devices disposed along said track, each associated with a respective stack receiver and each positioned for cooperation with a travelling article holder to act on the means mounting the jaw assembly of such article holder to overcome said urging means and move the jaw assembly to its projecting position in alignment with the associated stack receiver for transfer of an article from the article holder to such receiver,
  (ii) the cooperation between each said operating device and an article holder being continuous during the period of transfer of an article from the holder to a stack receiver whereby the position of the jaw assembly of the article holder is uniquely determined by the position of the holder along the conveyor track.

7. A conveyor system for transporting flat articles, comprising
(a) a conveyor defining a direction of travel,
(b) a series of stack receivers disposed along said conveyor adjacent thereto,
(c) and a plurality of article holders connected to said conveyor, each for transporting an article and depositing said article in a selected stack receiver,
(d) each said article holder comprising
  (i) a jaw assembly for holding a flat article generally in a plane in which said direction of travel lies with said article projecting laterally from said jaw assembly,
  (ii) and means mounting said jaw assembly for movement generally transversely of said direction of travel between a withdrawn position and a projecting position,
(e) and each stack receiver including
  (i) means mounting previously deposited articles as a compressed stack urged to extend yieldably into the path of travel of a jaw assembly in projecting position,
  (ii) and means for arresting further travel of an article conveyed by a projecting jaw assembly in alignment with the previously deposited articles while defining a passageway for continued travel of the jaw assembly whereby to withdraw the newly arrived article from the jaw assembly and add it to the stack,
(f) wherein each said jaw assembly includes a pair of individual jaw members relatively movable between an open, article-receiving position and a closed, article-conveying position,
(g) and wherein said system further includes
  (i) locking means associated with each said jaw assembly for movement between an operative position in which an article held within closed jaw members is firmly engaged and retained therein and an inoperative position in which said article is gently engaged while still retained therein,
  (ii) and means interconnecting each said locking means with its associated jaw assembly for moving said locking means to its inoperative position upon movement of said jaw assembly to its projecting position preparatory to deposit of an article in a stack receiver.

8. A conveyor system according to claim 7, wherein said jaw assembly further includes anti-rebound means effective in the open, article-receiving position of the jaw members to inhibit any tendency of an article moved into position between said jaw members to rebound outwardly therefrom.

9. A conveyor system for transporting flat articles, comprising
(a) a conveyor defining a direction of travel,
(b) a series of stack receivers disposed along said conveyor adjacent thereto,
(c) and a plurality of article holders connected to said conveyor, each for transporting an article and depositing said article in a selected stack receiver,
(d) each said article holder comprising
  (i) a jaw assembly for holding a flat article generally in a plane in which said direction of travel lies with said article projecting laterally from said jaw assembly,
  (ii) and means mounting said jaw assembly for movement generally transversely of said direction of travel between a withdrawn position and a projecting position,
(e) and each said stack receiver including
  (i) means mounting previously deposited articles as a compressed stack urged to extend yieldably into the path of travel of a jaw assembly in projecting position,
  (ii) and means for arresting further travel of an article conveyed by a projecting jaw assembly in alignment with the previously deposited articles while defining a passageway for continued travel of the jaw assembly whereby to withdraw the newly arrived article from the jaw assembly and add it to the stack,
(f) wherein each said article holder includes a facing member having a surface arranged in a leading position on said holder to be first to engage with articles of a stack when jaw assembly enters a stack receiver, said surface being inclined rearwardly and outwardly in relation to the direction of travel and the direction of projection of the jaw assembly to push back the most recently arrived articles of said stack to make room for the newly arriving article.

10. A conveyor system for transporting flat articles, comprising
(a) a conveyor defining a direction of travel,
(b) a series of stack receivers disposed along said conveyor adjacent thereto,
(c) and a plurality of article holders connected to said conveyor, each for transporting an article and depositing said article in a selected stack receiver,
(d) each said article holder comprising
  (i) a jaw assembly for holding a flat article generally in a plane in which said direction of travel lies with said article projecting laterally from said jaw assembly,
  (ii) and means mounting said jaw assembly for movement generally transversely of said direction of travel between a withdrawn position and a projecting position, (e) and each stack receiver including
  (i) means mounting previously deposited articles as a compressed stack urged to extend yieldably into the path of travel of a jaw assembly in projecting position,
  (ii) and means for arresting further travel of an article conveyed by a projecting jaw assembly in alignment with the previously deposited articles while defining a passageway for continued travel of the jaw assembly whereby to withdraw the newly arrived article from the jaw assembly and add it to the stack,
(f) wherein each said stack receiver is arranged to hold a stack of articles with the plane of the outermost article inclined rearwardly and outwardly in relation ot the direction of travel and the direction of projection of a jaw assembly at the initial position of entering said stack receiver and coming into engagement with said stack.

11. A conveyor system according to claim 10, including means for temporarily modifying the direction of travel of a jaw assembly during cooperation of the same with a stack receiver to turn said jaw assembly to travel substantially parallel to the plane of the outermost article at a position within said stack receiver beyond said initial position.

12. A conveyor system for transporting flat articles, comprising
(a) a fixed conveyor track defining a direction of travel,
(b) a series of stack receivers disposed along said conveyor track adjacent thereto,
(c) a plurality of article holders,
(d) means for moving each of said article holders along said conveyor track for transporting an article and depositing said article in a selected stack receiver,
(e) each said article holder comprising
  (i) a jaw assembly for holding a said article,
  (ii) means mounting said jaw assembly for movement generally transversely of said direction of travel between a withdrawn position and a projecting position,
  (iii) and means continuously urging said jaw assembly to withdrawn position,
(f) and said conveyor track including
  (i) a series of operating devices disposed along said track, each associated with a respective stack receiver and each positioned for cooperation with a travelling article holder to act on the means mounting the jaw assembly of such article holder to overcome said urging means and move the jaw assembly to its projecting position in alignment with the associated stack receiver for transfer of an article from the article holder to such receiver,
  (ii) the cooperation between said operating device and an article holder being continuous during the period of transfer of an article from the holder to a stack receiver whereby the position of the jaw assembly of the article holder is uniquely determined by the position of the holder along the conveyor track,
  (g) wherein the means mounting the jaw assembly of each article holder includes means for moving said mounting means between an operative position in which said mounting means lies in alignment with a said operating device on the conveyor track for cooperation as defined in paragraph (f) above and an inoperative position in which said mounting means lies out of alignment with a said operating device to pass the same without said cooperation,
  (h) and including a further series of setting devices disposed along said track, each positioned upstream of an associated operating device and each movable into a position for cooperation with a said moving means to move its associated mounting means to operative position.

13. A conveyor system according to claim 12, including a further series of resetting devices disposed along said track, each positioned downstream of an associated operating device and each positioned for cooperation with a said moving means to return an associated mounting means in operative position to inoperative position.

14. An article holder comprising:
(a) a carriage including means defining orientation of said carriage for travel along a conveyor,
(b) article-gripping mechanism for holding a flat article for travel with the carriage,
(c) means mounting said mechanism on said carriage for movement generally transversely of the direction of travel of said carriage between a withdrawn position and a projecting position,
(d) locking means associated with said mechanism and changeable between a first condition in which an article held by said mechanism is firmly engaged and retained thereby and a second condition in which said article is gently engaged while still retained thereby,
(e) and means interconnecting said locking means and said mounting means for changing said locking means to its second condition upon achievement by said mechanism of its projecing position.

15. An article holder according to claim 14, wherein said article holder includes a facing member having a surface arranged in a leading position on said holder, said surface being inclined rearwardly and outwardly in relation to the direction of travel of said carriage along the conveyor and the direction of projection of the jaw assembly, whereby to enable said surface to push back the more recently arrived articles in a stack receiver to make room for a newly arriving article introduced by the jaw assembly.

References Cited in the file of this patent
UNITED STATES PATENTS

| | | |
|---|---|---|
| 1,094,048 | Barber | Apr. 21, 1914 |
| 1,444,088 | Sheldon | Feb. 6, 1923 |
| 1,569,256 | Bobst | Jan. 12, 1926 |
| 2,072,318 | Staude | Mar. 2, 1937 |
| 2,761,570 | Benson | Sept. 4, 1956 |
| 2,795,328 | Tyler | June 11, 1957 |
| 2,818,987 | Krupp | Jan. 7, 1958 |
| 2,963,177 | Shields | Dec. 6, 1960 |